United States Patent
Tao et al.

(10) Patent No.: US 11,049,228 B2
(45) Date of Patent: Jun. 29, 2021

(54) CONTROLLING DISPLAY BRIGHTNESS WHEN RENDERING COMPOSED SCENE-REFERRED AND OUTPUT-REFERRED CONTENT

(71) Applicant: Microsoft Technology Licensing, LLC, Redmond, WA (US)

(72) Inventors: Simon Young Tao, Redmond, WA (US); David Foster Spruill, Redmond, WA (US); Rajat Jain, Sammamish, WA (US); Katie Anderson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/574,641

(22) Filed: Sep. 18, 2019

(65) Prior Publication Data
US 2021/0027435 A1     Jan. 28, 2021

Related U.S. Application Data

(60) Provisional application No. 62/878,562, filed on Jul. 25, 2019.

(51) Int. Cl.
*G09G 5/02*     (2006.01)
*G06T 5/00*     (2006.01)
(Continued)

(52) U.S. Cl.
CPC ............. *G06T 5/009* (2013.01); *G06T 5/50* (2013.01); *G09G 3/3406* (2013.01);
(Continued)

(58) Field of Classification Search
CPC . G06T 5/009; G06T 5/50; G06T 2207/20208; G09G 3/3406; G09G 2320/0233
See application file for complete search history.

(56) References Cited

U.S. PATENT DOCUMENTS

2018/0241979 A1    8/2018   Kanda et al.
2018/0300921 A1   10/2018   Aiba et al.
(Continued)

FOREIGN PATENT DOCUMENTS

WO     2018066482 A1     4/2018

OTHER PUBLICATIONS

"AdvancedColorInfo Class", Retrieved from: https://docs.microsoft.com/en-us/uwp/api/windows.graphics.display.advancedcolorinfo, Retrieved Date: Jun. 4, 2019, 3 Pages.
(Continued)

*Primary Examiner* — Charles Tseng
(74) *Attorney, Agent, or Firm* — Ray Quinney & Nebeker; Tiffany Healy

(57) ABSTRACT

Devices and methods for controlling display brightness may include receiving a brightness input for controlling a luminance level of at least one display in communication with the computer device. The devices and methods may include receiving high dynamic range (HDR) content and standard dynamic range (SDR) content for presentation on at least one display. The devices and methods may include generating adjusted SDR content by using the brightness input to modify luminance of the SDR content. The devices and methods may include blending the adjusted SDR content and the HDR content together to create a composed framebuffer content with the adjusted SDR content and the HDR content and transmitting the composed framebuffer content for presentation on at least one display.

18 Claims, 5 Drawing Sheets

(51) Int. Cl.
*G09G 3/34* (2006.01)
*G06T 5/50* (2006.01)

(52) U.S. Cl.
CPC .............. *G06T 2207/20208* (2013.01); *G09G 2320/0233* (2013.01); *G09G 2360/144* (2013.01); *G09G 2370/20* (2013.01)

(56) References Cited

U.S. PATENT DOCUMENTS

| | | |
|---|---|---|
| 2018/0330674 A1 | 11/2018 | Baar et al. |
| 2019/0287494 A1* | 9/2019 | Yokota .................... G06T 5/009 |
| 2020/0105221 A1* | 4/2020 | Marcu ..................... G06T 5/009 |

OTHER PUBLICATIONS

"International Search Report and Written Opinion Issued in PCT Application No. PCT/US20/036722", dated Sep. 4, 2020, 21 Pages.

\* cited by examiner

CONTROLLING DISPLAY BRIGHTNESS WHEN RENDERING COMPOSED SCENE-REFERRED AND OUTPUT-REFERRED CONTENT

RELATED APPLICATION

This application claims priority to U.S. Application No. 62/878,562 titled "Controlling Display Brightness When Rendering Composed Scene-Referred and Output-Referred Content," filed Jul. 25, 2019, which is incorporated herein by reference in its entirety.

BACKGROUND

The present disclosure relates to controlling display brightness.

Most digital visual content (e.g., photos, videos, text) is output-referred content with respect to luminance, where the colors of the content are encoded using a relative scale. When the content is rendered on a display, the actual luminance is controlled by the user (or the device) depending on viewing conditions. A new form of digital content is scene-referred with respect to luminance, where the content is encoded with explicit, absolute luminance levels. Devices may adjust actual luminance on the display since user preferences and/or viewing conditions may not match the optimal content viewing conditions for the scene-referred content.

Thus, there is a need in the art for improvements in controlling display brightness when displaying output-referred content and/or scene-referred content.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, at least one processor configured to communicate with the memory, and an operating system in communication with the memory and the at least one processor, wherein the operating system is operable to: receive a brightness input for controlling a luminance level of at least one display in communication with the computer device; receive, from one or more applications, high dynamic range (HDR) content and standard dynamic range (SDR) content for presentation on the at least one display; generate adjusted SDR content by using the brightness input to modify luminance of the SDR content; blend the adjusted SDR content and the HDR content together to create a composed framebuffer content with the adjusted SDR content and the HDR content; and transmit the composed framebuffer content for presentation on the at least one display.

Another example implementation relates to a method for controlling display brightness. The method may include receiving, at an operating system on a computer device, a brightness input for controlling a luminance level of at least one display in communication with the computer device. The method may include receiving, from one or more applications, high dynamic range (HDR) content and standard dynamic range (SDR) content for presentation on the at least one display. The method may include generating adjusted SDR content by using the brightness input to modify luminance of the SDR content. The method may include blending the adjusted SDR content and the HDR content together to create a composed framebuffer content with the adjusted SDR content and the HDR content. The method may include transmitting the composed framebuffer content for presentation on the at least one display.

Another example implementation relates to computer-readable medium storing instructions executable by a computer device. The computer-readable medium may include at least one instruction for causing the computer device to receive a brightness input for controlling a luminance level of at least one display in communication with the computer device. The computer-readable medium may include at least one instruction for causing the computer device to receive, from one or more applications, high dynamic range (HDR) content and standard dynamic range (SDR) content for presentation on the at least one display. The computer-readable medium may include at least one instruction for causing the computer device to generate adjusted SDR content by using the brightness input to modify luminance of the SDR content. The computer-readable medium may include at least one instruction for causing the computer device to blend the adjusted SDR content and the HDR content together to create a composed framebuffer content with the adjusted SDR content and the HDR content. The computer-readable medium may include at least one instruction for causing the computer device to transmit the composed framebuffer content for presentation on the at least one display.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
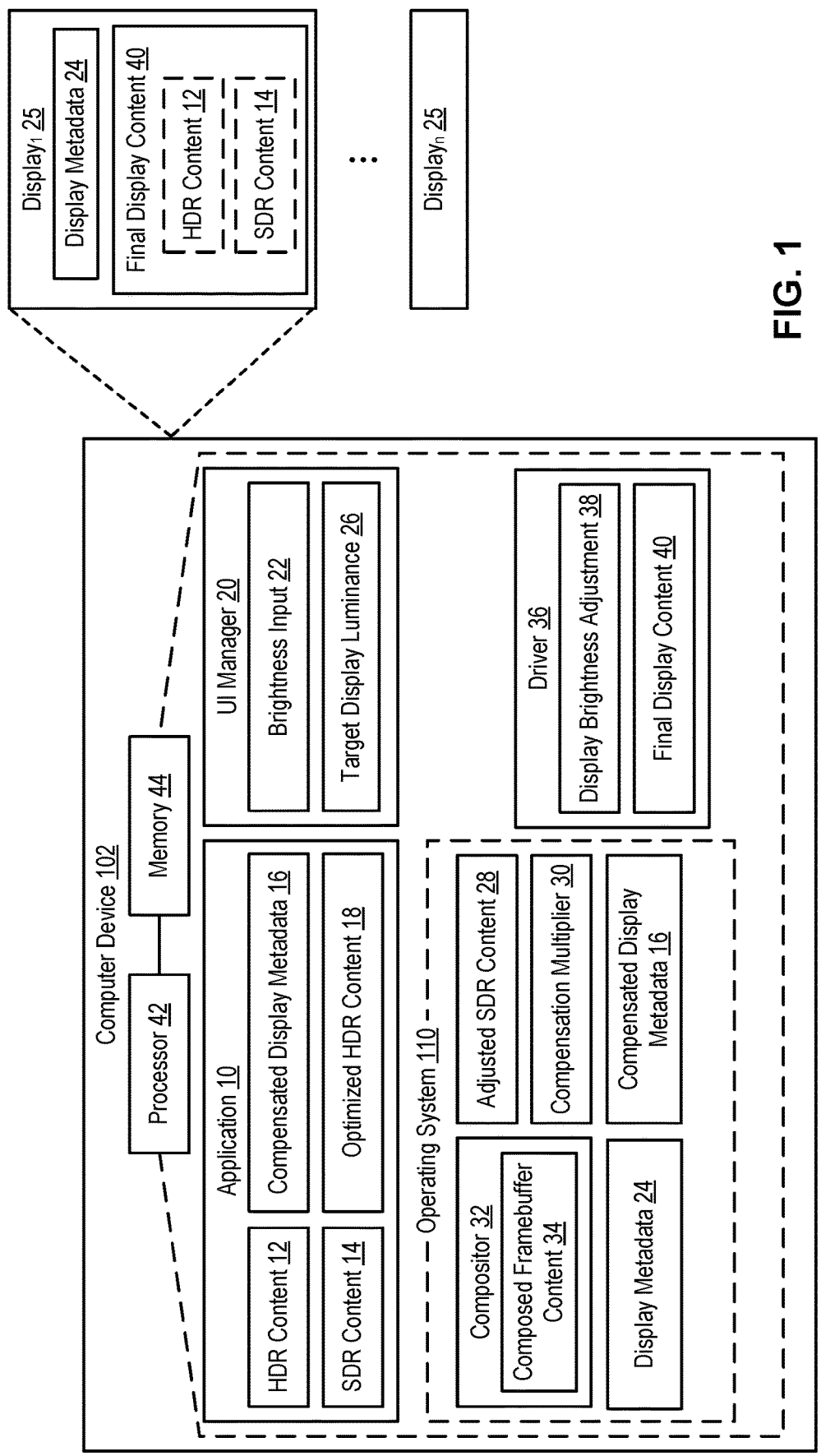
FIG. 1 is a schematic block diagram of an example computer device in accordance with an implementation of the present disclosure.

This disclosure relates to devices and methods for controlling display brightness when rendering scene-referred content and output-referred content. Displays may be configured to display brightness at various levels of display brightness. Displays may include capability values that provide a minimum and/or maximum possible luminance for the displays. The display brightness and/or the capability values can include a measurement of how much light the display device emits within a given area, and can be measured in nits, candelas (cd) per square meter (m²) (e.g., one nit=1 cd/m²), or any other similar metric.

Output-referred content (also referred to throughout as standard dynamic range "SDR" content) may be output-referred in reference to luminance. For example, SDR content colors are encoded using a relative scale, such as, 50% of reference white, where reference white is not defined ahead of time. When the SDR content is rendered on a display, the actual luminance is controlled by the user (or the device) depending on viewing conditions and/or user preferences. For example, a user and/or the device may set a reference white value equal to 200 nits in an indoor office or 600 nits while outdoors. SDR content may include, but is not limited to, photographs, videos, text, notifications, and/or icons.

Scene-referred content (also referred to throughout as high dynamic range "HDR" content) may be scene-referred with respect to luminance. HDR content may be encoded with explicit, absolute luminance levels, such as being encoded using the BT.2100 standard. In one example, 50% of reference white may be explicitly encoded at 200 nits. HDR content may also be optimized for a particular display by ensuring the dynamic range of colors in the HDR content can fit into the brightness capabilities of the display. As such, displays that present HDR content may handle brightness differently than displays that present SDR content.

In any modern computing environment, users may want to see multiple pieces of content simultaneously. For example, on a game console or personal computer, users may have multiple applications with HDR and SDR content open side by side, or an application may present overlapping HDR content and SDR content at the same time. Even when just viewing a single movie or game in HDR, captions, transport controls, or notifications may also be presented using SDR content. As such, displays that present both HDR content and SDR content may need to maintain the ability for users and/or devices to adjust the overall display brightness at once while preserving the brightness features of the HDR content. The present solution addresses the difficulty experienced by prior solutions in displaying HDR and SDR content contemporaneously, as the present solution allows the device to compose and/or blend scene-referred content and output-referred content in a consistent manner while also allowing a single brightness control to behave consistently for both HDR and SDR content.

The described devices and methods may control the brightness of a display when rendering a composed and/or mixed collection of SDR content and HDR content. For example, two side by side and/or overlapping application windows may display SDR content and HDR content contemporaneously, or a display window may contemporaneously present both SDR content and HDR content.

In an implementation, a desired display luminance level may be set by a user and/or a device in response to the viewing conditions and/or preferences of a user. Users normally only have a single notion of display brightness. However, in HDR scene-referred content, brightness may describe multiple independent values in the HDR scene-referred content, such as, but not limited to, peak or specular luminance in the HDR content versus reference or diffuse luminance in the HDR content. The described devices and methods may translate the specified display luminance level into a luminance adjustment for minimum, reference, and/or peak luminance in the HDR content.

The devices and methods may also ensure a relationship is preserved between the perceived luminance of output-referred and scene-referred content. For example, the devices and methods may adjust the white level of the output-referred content to match the reference white used by the scene-referred content so that the two types of content may be handled consistently when blended and/or composed together.

The devices and methods may perform the luminance adjustments during pre-composition and/or post-composition of the HDR content and the SDR content. Both the pre-composition luminance adjustments and the post-composition luminance adjustments may be performed by multiplying the color channel values by a coefficient in linear gamma space. In addition, the post-composition adjustment may be performed by modulating a backlight segment.

With brightness adjustments, the effective capabilities of a display may change over time. For example, the effective capabilities of a display may be inversely affected by the brightness adjustment. One example may include if the HDR content has an adjustment coefficient of 2.0x total, the effective maximum luminance capability of a display may be multiplied by ½x. As such, the devices and methods may report modified capabilities of the display back to applications and/or content renderers so that optimizations, such as, but not limited to, tone mapping, may be performed on the HDR content for the display. Reporting modified capabilities of the display(s) may ensure the dynamic range of colors in the optimized HDR content may fit into the capabilities of the display(s) when performing the brightness adjustments on the optimized HDR content. The described devices and methods may be utilized with high end productivity, creativity, and/or entertainment applications, which desire to have predictable behavior when rendering content to the screen. For example, when a television is attached to a computer device, the user is recommended to enable a game mode, which reduces television image processing. When performing scene-referred luminance adjustments, updated information about the luminance state of the display may be provided to the applications on the computer device in order for the applications to adapt the HDR content accordingly.

As such, the devices and methods described herein may preserve existing user expectations for a single master brightness control that behaves consistently with the expectations of the user, while preserving the brightness features of the HDR content, thereby providing an improved display of mixed SDR and HDR content.

Referring now to FIG. 1, illustrated is an example computer device 102 for use with controlling display brightness of one or more displays 25 in communication with computer device 102. Display 25 may be capable of presenting final display content 40 that may be composed of only of output referred SDR content 14, only of scene referred HDR content 12, and/or a combination of both HDR content 12 and SDR content 14. Display 25 may include display metadata 24 that provides information relating to the brightness capabilities of displays 25. For example, display metadata 24 may provide one or more supported ranges of display brightness capability values (e.g., as measured in nits or other units, such as millinits).

Computer device 102 may include a plurality of applications 10 executed or processed by processor 42 and/or system memory 44 of computer device 102. Applications 10 may generate scene referred HDR content 12 for presentation on display 25. HDR content 12 may encode explicit, absolute luminance levels using, for example, the BT.2100 standard. Users normally only have a single notion of display brightness. However, brightness in HDR content 12 may describe multiple independent values, such as, but not limited to, peak or specular luminance versus reference or diffuse luminance. Examples of HDR content 12 may include, but are not limited to, photographs, videos, games, text notifications, icons, and/or images. HDR content 12 may also be optimized by applications 10 for a particular display by ensuring the dynamic range of colors in the HDR content 12 can fit into the brightness capabilities of the display 25.

In addition, applications 10 may generate output referred SDR content 14 for presentation on display 25. SDR content 14 may include any digital content where the content colors are encoded using a relative scale, such as, 50% of reference white, where reference white is not defined ahead of time. Examples of SDR content 14 may include, but are not limited to, photographs, videos, games, text, notifications, icons and/or images.

Computer device 102 may include a user interface (UI) manager 20 that receives a brightness input 22 to control a luminance level of display(s) 25. The brightness input 22 may apply a global change to the luminance level of display(s) 25. A user and/or computer device 102 may select the brightness input 22 in response to viewing conditions and/or user preferences. For example, the brightness input 22 for indoor viewing may include setting reference white to 200 nits, while the brightness input 22 for outdoor viewing may include setting reference white to 600 nits. A user may set and/or adjust the brightness input 22 by sliding an icon, such as a brightness slider with selectable luminance ranges of display(s) 25. In addition or in the alternative, computer device 102 may set and/or adjust the brightness input 22 by using, for example, an ambient light sensor on computer device 102 to measure the ambient light, and may provide the measure for generating the brightness input 22. In addition or in the alternative, computer device 102 may set and/or adjust the brightness input 22 from inputs and/or triggers received from other applications or system policies, such as, power saving.

UI manager 20 may also receive target display luminance information 26 that may be used to determine a relative level of brightness between SDR content 14 and HDR content 12, e.g., an SDR:HDR brightness ratio. For example, target display luminance information 26 may be used to ensure a relationship is preserved between the perceived luminance of SDR content 14 and HDR content 12 so that SDR content 14 may appear pleasing to a user when displayed next to HDR content 12. The target display luminance information 26 may identify an amount to increase the colors of SDR content 14 by in order to maintain the relationship of the perceived luminance between SDR content 14 and HDR content 12. The target display luminance information 26 may be predetermined by computer device 102 and/or may be received by user input.

Computer device 102 may include any mobile or fixed computer device, which may be connectable to a network. Computer device 102 may be, for example, a computer device such as a desktop or laptop or tablet computer, an internet of things (IOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may include an operating system 110 executed by processor 54 and/or memory 56. Memory 56 of computer device 102 may be configured for storing data and/or computer-executable instructions defining and/or associated with operating system 110, and processor 54 may execute such data and/or instructions to instantiate operating system 110. An example of memory 56 can include, but is not limited to, a type of memory usable by a computer, such as random access memory (RAM), read only memory (ROM), tapes, magnetic discs, optical discs, volatile memory, non-volatile memory, and any combination thereof. An example of processor 54 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 110 may also receive display metadata 24 from each display 25 in communication with computer device 102. The display metadata 24 may be used by applications 10 to generate optimized HDR content 18, such as but not limited to, by performing tone mapping on HDR content 12 to ensure that the dynamic range of colors in HDR content 12 may fit into the brightness capabilities of display 25. For example, the color range in the HDR content 12 may exceed a range of colors that display 25 is capable of presenting. For instance, HDR content 12 may have a 100,000:1 dynamic range, while display 25 may only support tonal values between 1 and 360. As such, applications 10 may generate optimized HDR content 18 to adjust and/or modify the color range of the HDR content 18 to remain within the brightness capabilities of display 25.

Operating system 110 may also receive SDR content 14, HDR content 12, and/or any optimized HDR content 18 from application(s) 10. In addition, operating system 110 may receive the target display luminance information 26 and/or the brightness input 22.

Operating system 110 may use the target display luminance information 26 to adjust the luminance levels of SDR content 14 to match the reference white used by HDR content 12 to ensure a relationship is preserved between the perceived luminance of SDR content 14 and HDR content 12. Operating system 110 may use the target display luminance information 26 to generate adjusted SDR content 28. For example, if application 10 composed SDR content 14 at 80 nits and the target display luminance information 26 indicated a three times boost for SDR content 14, operating system 110 may generate adjusted SDR content 28 at 240 nits (e.g., 80 nits multiplied by 3). The target display luminance information 26 may allow consistent handling of SDR content 14 and HDR content 12 when blended and/or composed together. Operating system 110 may also perform a luminance adjustment on HDR content 12 or any optimized HDR content 18. In addition, operating system 110 may perform luminance adjustments on both HDR content 12 (or any optimized HDR content 18) and SDR content 14. Operating system 110 may perform luminance adjustments to provide a consistent luminance range for both HDR content 12 (or any optimized HDR content 18) and SDR content 14.

Operating system 110 may also include a compositor 32 to blend the adjusted SDR content 28 and the HDR content 12 or any optimized HDR content 18 together into composed framebuffer content 34. The composed framebuffer content 34 may allow display 25 to present both the adjusted SDR content 28 and the HDR content 12 and/or any optimized HDR content 18 at the same time on display 25. The composed framebuffer content 34 may be transmitted to driver 36 for further processing prior to presentation on display 25.

Operating system 110 may also determine a compensation multiplier 30 to use by the driver 36 to perform a display brightness adjustment 38 on the composed framebuffer content 34. The compensation multiplier 30 may be determined by dividing the brightness input 22 by the adjusted SDR content 28. For example, if the brightness input 22 is 360 nits and the adjusted SDR content 28 is at 240 nits, the compensation multiplier 30 may be 1.5 (e.g., 360 nits divided by 240 nits). The compensation multiplier 30 may be sent to the driver 36.

In addition, operating system 110 may use the compensation multiplier 30 to determine compensated display metadata 16 that may provide modified brightness capabilities of display 25. For example, the compensated display metadata 16 may report a lower brightness capability of display 25 than provided in the display metadata 24. With brightness adjustment, the brightness capabilities of display 25 may change over time. Operating system 110 may report the compensated display metadata 16 back to applications 10 and/or content renderers so that applications 10 may generate optimized HDR content 18 using, for example, tone mapping. By using the compensated display metadata 16 to generate optimized HDR content 18, applications 10 may ensure that the dynamic range of colors within the optimized HDR content 18 may remain within the brightness capabilities of display 25 when performing any brightness adjustments on the optimized HDR content 18.

Driver 36 may receive the composed framebuffer content 34 and the compensation multiplier 30 from operating system 110. Driver 36 may perform a display brightness adjustment 38 on the composed framebuffer content 34 by multiplying the luminance values of the composed frame buffer content 34 by the compensation multiplier 30 to generate final display content 40. For example, if the composed framebuffer content 34 includes adjusted SDR content at 240 nits and HDR content 12 at 100 nits, the final display content 40 may include final SDR content at 360 nits (e.g., 240 nits multiplied by 1.5) and final HDR content at 150 nits (e.g., 100 nits multiplied by 1.5). Post-composition display brightness adjustments may be performed either by driver 36, display 25, and/or by operating system 110.

Driver 36 may transmit the final display content 40 for presentation of display(s) 25. The final display content 40 may include both the final SDR content and the final HDR content with the display brightness adjustments 38 performed.

By using operating system 110 and driver 36 to control the display brightness, the luminance adjustments may be divided between pre-composition and post-composition of the HDR content and the SDR content. In an implementation, UI manager 20, operating system 110, and/or driver 36 may perform any of the above operations. As such, operating system 110, UI manager 20, graphics hardware, and/or driver 36 may control the display brightness. In addition, operating system 110, UI manager 20, graphics hardware, and/or driver 36 may perform luminance adjustments during the pre-composition and post-composition of HDR content 12 and SDR content 14.

Applications 10 and/or content providers may be unaware of any brightness adjustments being made on the SDR content 14, HDR content 12, and/or optimized HDR content 18. As such, applications 10 and/or content providers may continue to operate normally while the SDR content 14, HDR content 12, and/or optimized HDR content 18 may be adjusted in response to any received brightness input 22 prior to presentation on display(s) 25. A user may be able to view SDR content 14, HDR content 12, and/or optimized HDR content 18 at the same time while allowing a single brightness control to behave consistently for SDR content 14, HDR content 12, and/or optimized HDR content 18.

Figure 2:
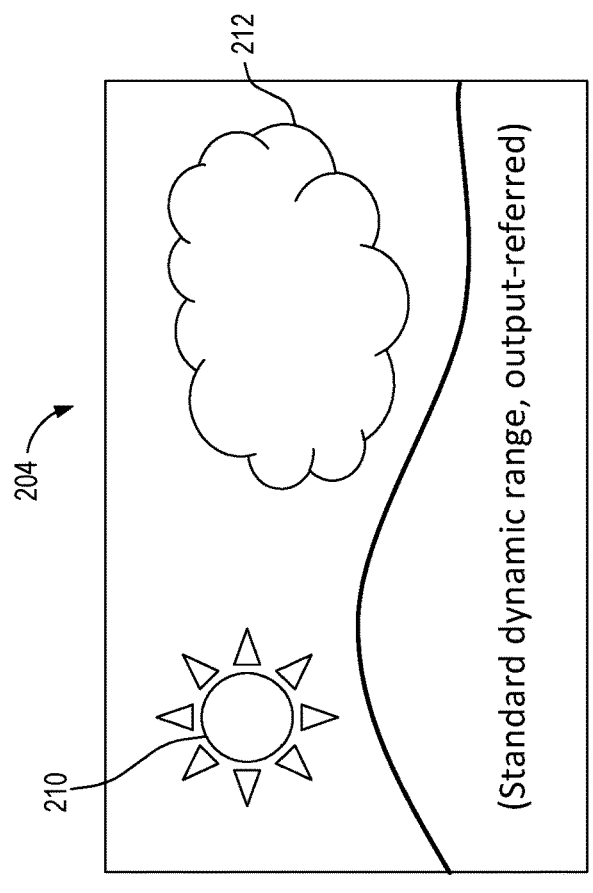
FIG. 2 is an example of SDR content and HDR content in accordance with an implementation of the present disclosure.
Figure 2:
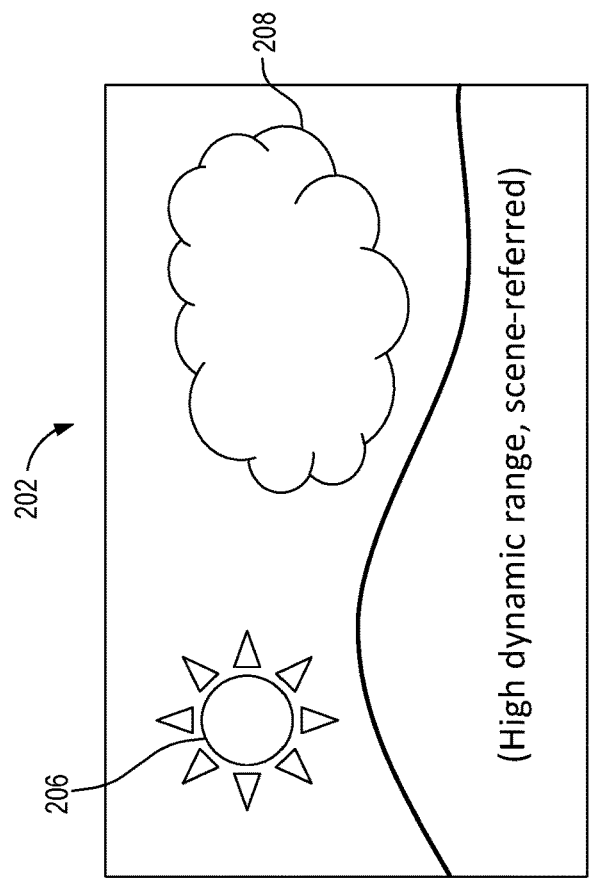

Referring now to FIG. 2, illustrated is an example of HDR content 202 and SDR content 204 that may be presented on display 25 (FIG. 1). HDR content 202 may include a first area (e.g., sun 206) with a peak brightness highlight, which may be greater than 1000 nits. HDR content 202 may also include a second area (e.g., cloud 208) with diffuse and/or reference white, which may be less than 200 nits. As such, the sun 206 may appear brighter relative to the surrounding areas and cloud 208 may appear dimmer relative to the peaks of brightness in HDR content 202.

SDR content 204 may include an area of peak brightness highlights (e.g., sun 210) without defining the nits for the area of peak brightness. The sun 210 may appear almost the same brightness as the surrounding areas. In addition, SDR content 204 may include an area diffuse and/or reference white (e.g., cloud 212) without defining the nits for cloud 212. As such, cloud 212 may appear almost the same brightness as the highlights in SDR content 204.

Figure 3:
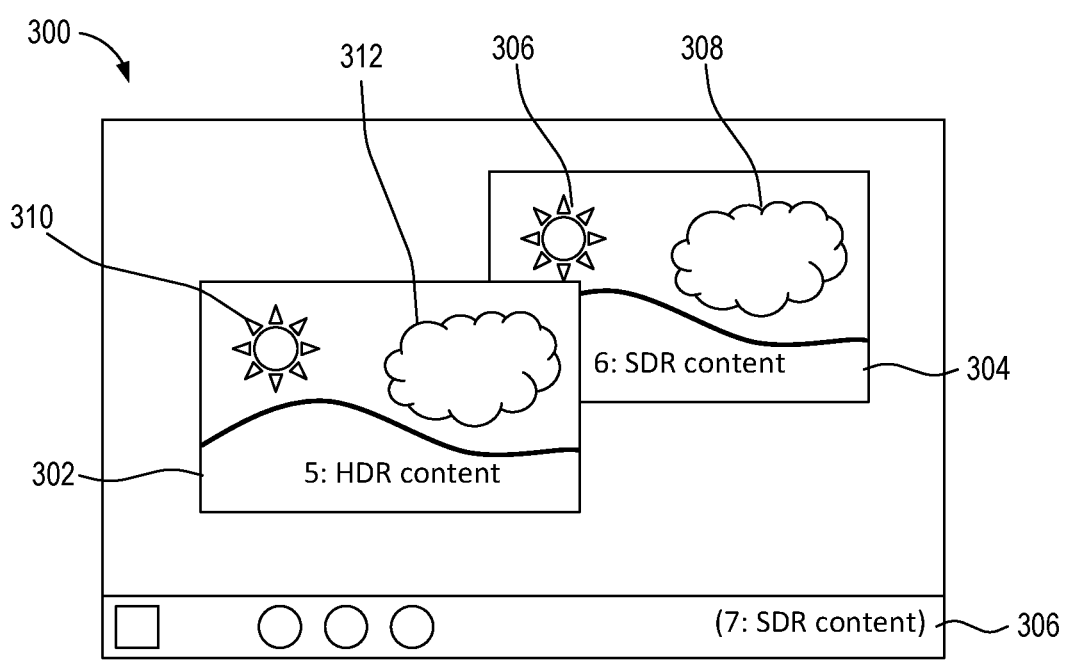
FIG. 3 is an example of SDR content and HDR content displayed on the same display in accordance with an implementation of the present disclosure.
Figure 4:
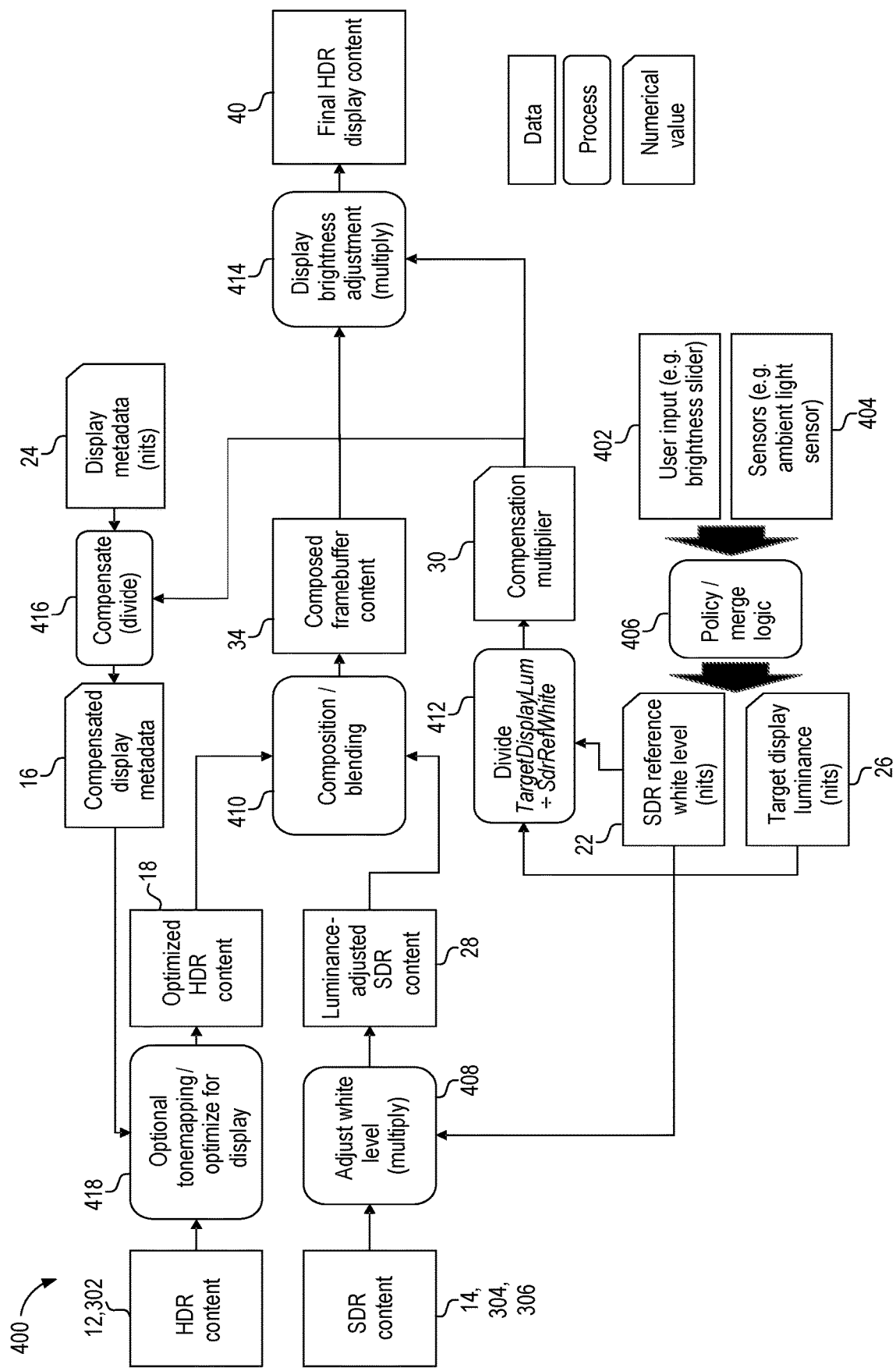
FIG. 4 is an example of a method flow for controlling display brightness in accordance with an implementation of the present disclosure.

Referring now to FIGS. 3 and 4, respectively illustrated are an example graphical user interface 300 for presenting HDR content 302 and SDR content 304, 306 contemporaneously on display 25 (FIG. 1), and an example method 400 that may be used by computer device 102 (FIG. 1) to control the display brightness of display 25 for contemporaneously presenting HDR content 302 and SDR content 304. User interface 300 is discussed with reference to method 400 and the architecture of FIG. 1.

SDR content 304 may include a peak white area (e.g., sun 306) and a diffuse white area (e.g., cloud 308). Both the sun 306 and the cloud 308 may be set at a nominal 80 nits. 80 nits may be selected as the nominal white level as defined by sRGB (IEC 61966-2-1:1999). The nominal white level may be any predetermined value. HDR content 302 may include a peak white area (e.g., sun 310) set at 1000 nits and a diffuse white area (e.g., cloud 312) set at 200 nits. The nits for SDR content 304, SDR content 306, and HDR content 302 may be set, for example, by operating system 110.

At 402 and 404, method 400 may include receiving a brightness input 22 for displaying content on one or more displays. For example, UI manager 20 may receive the brightness input 22 and may transmit the brightness input 22 to operating system 110. The brightness input 22 may set a SDR reference white level in nits for displaying content on one or more displays 25. The brightness input 22 may vary based on viewing conditions of the displays. For example, indoor viewing conditions may have a different brightness input 22 relative to outdoor viewing conditions. A user may set and/or adjust the brightness input 22 by sliding an icon, such as, a brightness slider with selectable luminance ranges of display(s) 25. In addition or in the alternative, computer device 102 may set and/or adjust the brightness input 22 by using, for example, an ambient light sensor on computer device 102 to measure the ambient light, and may provide the measure for generating the brightness input 22. Computer device 102 may also set and/or adjust the brightness input 22 from inputs and/or triggers received from other applications or system policies, such as, power saving.

At 406, method 400 may include executing a policy and/or merge logic for determining the brightness input (also referred to as SDR reference white level 22) and target display luminance 26 for one or more displays. UI manager 20 and/or operating system 110 may execute a policy and/or merge logic for determining the brightness input 22 and/or target display luminance 26. For example, operating system 110 may define any number of rules and/or policies for modifying and/or ignoring any received user input or ambient sensor input to use when determining the brightness input 22. An example policy may include when the user requests a very bright target luminance, e.g. 600 nits, but, an operating system power manager is attempting to save battery life and/or reduce power consumption, and thus, reduces the display brightness by 20%. In this example, both the user and sensor (e.g., battery life) input is combined together when determining the brightness input 22. An alternate example may include operating system 110 using an ambient light sensor and attempting to have the display match the surrounding ambient light conditions. Operating system 110 may ignore any received user input adjusting the display brightness. Another example may include operating system 110 using the target display luminance 26 information when defining the rules and/or policies.

Operating system 110 may calculate a single target display luminance 26 and a single SDR reference white level (also referred to as brightness input 22) that may be used in performing the brightness adjustments discussed throughout method 400. In this example, the target display luminance 26 information for user interface 300 may be set to 360 nits by a user or computer device 102. The SDR reference white level 22 (or, the brightness input 22) for user interface 300 may be set to 240 nits by a user or computer device 102.

At 408, method 400 may include generating adjusted SDR content 28. For example, SDR content 304 and SDR content 306 may be adjusted by operating system 110, processor 42, and/or memory 44 to generate adjusted SDR content 28. The adjusted SDR content 28 may be calculated by using equation (1):

$$\text{SDR Adjusted Content(nits)} = \text{SDR Input} * (\text{SDR Reference White Level}/\text{Nominal White Level}) \quad (1)$$

where:
SDR input is a luminance (e.g., nit) value of SDR content 304 and/or 306; SDR Reference White Level is a luminance (e.g., nit) value of SDR reference white level 22 that is output by the policy and/or merge logic at 406; and
Nominal White Level is a predetermined luminance (e.g., nit) value.

As such, the adjusted SDR content 28 for SDR peak white area sun 306 and SDR diffuse white area cloud 308 may be adjusted to 240 nits (e.g., 80 nits*240 nits/80 nits). In addition, SDR content 306 may be adjusted in a similar manner to 240 nits.

At 410, method 400 may include blending the adjusted SDR content 28 and the HDR content (either original HDR content 302 or optimized HDR content 18) together to generate composed framebuffer content 34. For example, the adjusted SDR content 28 (e.g., SDR content 304 and SDR content 306) may be composed and/or blended together with HDR content 302 by compositor 32 to generate composed frame buffer content 34. For example, compositor 32 may use any blend operation, such as, but not limited to, alpha compositing, and/or Porter Duff blends to combine adjusted SDR content 28 and HDR content 302 or optimized HDR content 18.

At 412, method 400 may include determining a compensation multiplier 30. Operating system 110, processor 42, and/or memory 44 may calculate a compensation multiplier 30 to use in adjusting the brightness of the adjusted SDR content 28 and the HDR content 302. The compensation multiplier 30 may be calculated using equation (2):

$$\text{Compensation Multiplier} = \text{Target Display Luminance}/\text{SDR Reference White Level} \quad (2)$$

where:
Target Display Luminance 26 is a luminance (e.g., nit) value that is output by the policy and/or merge logic at 406;
SDR Reference White Level is a luminance (e.g., nit) value of SDR reference white level 22 that is output by the policy and/or merge logic at 406.

In this example, the compensation multiplier 30 may be equal to 1.5 (e.g., 360 nits/240 nits).

At 414, method 400 may include performing a display brightness adjustment on the composed framebuffer content 34. Driver 36 may perform a display brightness adjustment 38 on the composed framebuffer content 34 using the compensation multiplier 30 to generate the final display content 40. The final display content 40 may be determined using equations (3) and (4):

$$\text{SDR Final(nits)} = \text{SDR Adjusted Content} * \text{Compensation Multiplier} \quad (3)$$

$$\text{HDR Final(nits)} = \text{HDR Input} * \text{Compensation Multiplier} \quad (4)$$

where:
SDR Final is a luminance (e.g., nit) value of SDR adjusted content 28 determined at 408 multiplied by compensation multiplier 30 determined at 412; and
HDR Final is a luminance (e.g., nit) value of HDR Input (e.g., optimized HDR content 18) multiplied by compensation multiplier 30.

As such, the SDR peak white sun 306 and SDR diffuse white cloud 308 final display content 40 may be 360 nits (e.g., 240 nits*1.5). The HDR peak white sun 310 final display content 40 may be 1500 nits (e.g., 1000 nits*1.5). The HDR diffuse white cloud 312 final display content 40 may be 300 nits (e.g., 200 nits*1.5).

At 416, method 400 may include determining compensated display metadata 16. Operating system 110 may receive the display metadata 24 indicating the brightness capability values of display(s) 25. The brightness capability values may include a measurement of how much light the display device is capable of emitting within a given area, and can be measured in nits, candelas (cd) per square meter (m²) (e.g., one nit=1 cd/m²). The brightness capability may include a minimum possible nits and/or a maximum possible nits display device 25 is capable of emitting. In addition, operating system 110 may receive the compensation multiplier 30 for performing a brightness adjustment on the composed frame buffer content 34. Operating system 110, processor 42, and/or memory 44 may modify the reported display metadata 24 and calculate a compensated display metadata 16 and may report the compensated display metadata 16 to applications 10 so applications 10 may automatically target a correct luminance range of display(s) 25.

The compensated display metadata 16 may be calculated using equation (5):

$$\text{Compensated Display Metadata} = \text{Original Display Metadata}/\text{Compensation Multiplier} \quad (5)$$

where:
Compensated Display Metadata 16 is a luminance (e.g., nit) value of the original display metadata 24 provided by display 25 divided by compensation multiplier 30.

In this example, display 25 may natively support 600 nits peak. As such, operating system 110 may report to applications 10 a compensated display metadata 16 of 400 nits (e.g., 600 nits/1.5).

At 418, method 400 may optionally include optimizing the HDR content. Applications 10 may perform one or more optimizations on HDR content 12 to generate optimized HDR content 18. For example, applications 10 may perform tone mapping on HDR content 12 to ensure that the luminance of optimized HDR content 18 does not exceed the brightness capabilities of display 25. The optimized HDR content 18 may be input into 410.

In this example, applications 10 may optimize HDR content 302 to 400 nits peak. As such, the HDR peak white sun 310 may be optimized to 400 nits, and the final display content 40 for the HDR content 302 may be calculated using equation (6):

$$\text{HDR Final(nits)} = \text{Optimized HDR Content} * \text{Compensation Multiplier} \quad (6)$$

where:
HDR Final is a luminance (e.g., nit) value of optimized HDR content 18 determined at 418 multiplied by compensation multiplier 30.

The HDR peak white sun 310 final display content 40 may be 600 nits (e.g., 400 nits*1.5). The HDR diffuse white cloud 312 final display content 40 may be 300 nits (e.g., 200 nits*1.5).

The final display content 40 may be transmitted to one or more displays 25 for presentation. For example, display 25 may present user interface 300 with the final display content 40 that combines HDR content 302 and SDR content 304/306.

Method 400 may control the brightness of a display when rendering a composed and/or mixed collection of SDR content and HDR content. Method 400 may maintain the ability for users and/or devices to adjust the display brightness while preserving the brightness features of the HDR content. In addition, method 400 may be used perform luminance adjustments during pre-composition and post-composition of the HDR content and the SDR content. As such, method 400 may preserve existing user expectations for a single master brightness control that behaves consistently with the expectations of the user, while preserving the brightness features of the HDR content.

Figure 5:
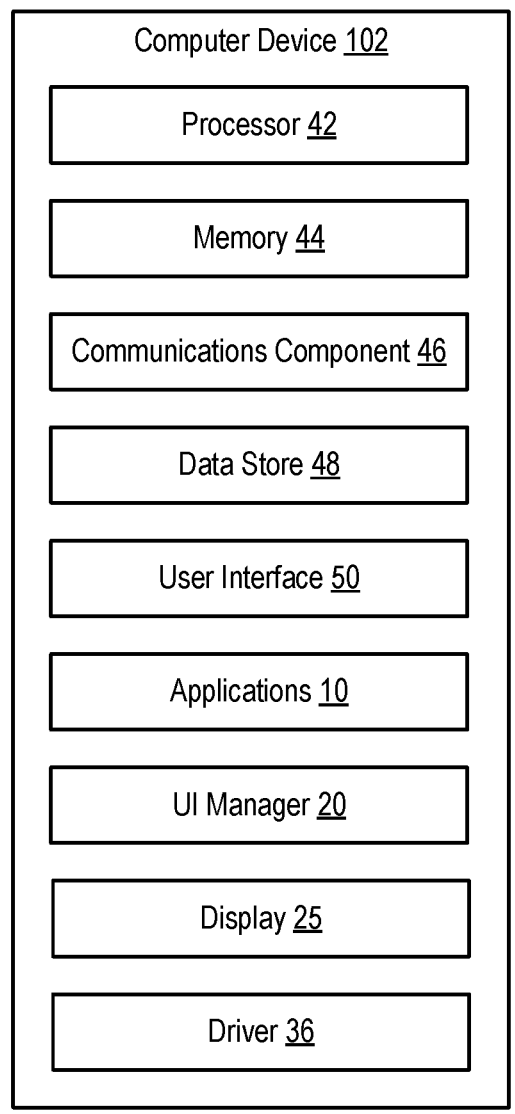
FIG. 5 is a schematic block diagram of an example device in accordance with an implementation of the present disclosure.

Referring now to FIG. 5 an example computer 500 that may be configured as computer device 102 in accordance with an implementation includes additional component details as compared to FIG. 1. In one example, computer 500 may include processor 42 for carrying out processing functions associated with one or more of components and functions described herein. Processor 42 can include a single or multiple set of processors or multi-core processors. Moreover, processor 42 can be implemented as an integrated processing system and/or a distributed processing system.

Computer 500 may further include memory 44, such as for storing local versions of applications being executed by processor 42. Memory 44 can include a type of memory usable by a computer, such as random access memory (RAM), read only memory (ROM), tapes, magnetic discs, optical discs, volatile memory, non-volatile memory, and any combination thereof. Additionally, processor 42 may include and execute operating system 110 (FIG. 1).

Further, computer 500 may include a communications component 46 that provides for establishing and maintaining communications with one or more parties utilizing hardware, software, and services as described herein. Communications component 46 may carry communications between components on computer device 102, as well as between computer device 102 and external devices, such as devices located across a communications network and/or devices serially or locally connected to computer device 102. For example, communications component 46 may include one or more buses, and may further include transmit chain components and receive chain components associated with a transmitter and receiver, respectively, operable for interfacing with external devices.

Additionally, computer 500 may include a data store 48, which can be any suitable combination of hardware and/or software, that provides for mass storage of information, databases, and programs employed in connection with implementations described herein. For example, data store 48 may be a data repository for applications 10, UI manager 20, driver 36 and/or display 25.

Computer 500 may also include a user interface component 50 operable to receive inputs from a user of computer device 102 and further operable to generate outputs for presentation to the user. User interface component 50 may include one or more input devices, including but not limited to a keyboard, a number pad, a mouse, display 25 (e.g., which may be a touch-sensitive display), a navigation key, a function key, a microphone, a voice recognition component, any other mechanism capable of receiving an input from a user, or any combination thereof. Further, user interface component 50 may include one or more output devices, including but not limited to a display, a speaker, a haptic feedback mechanism, a printer, any other mechanism capable of presenting an output to a user, or any combination thereof.

In an implementation, user interface component 50 may transmit and/or receive messages corresponding to the operation of applications 10, UI manager 20, driver 36 and/or display 25. In addition, processor 42 executes applications 10, UI manager 20, driver 36 and/or display 25, and memory 44 or data store 48 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory to store data and instructions;
    at least one processor configured to communicate with the memory;
    an operating system in communication with the memory and the at least one processor, wherein the operating system is operable to:
        receive a brightness input for controlling a luminance level of at least one display in communication with the computer device;
        receive, from one or more applications, high dynamic range (HDR) content and standard dynamic range (SDR) content for presentation on the at least one display;
        receive target display luminance information for use in determining a relative level of brightness between the received SDR content and the HDR content;
        generate adjusted SDR content by using the brightness input to modify luminance of the received SDR content;
    blend the adjusted SDR content and the HDR content together to create a composed framebuffer content with the adjusted SDR content and the HDR content;
    determine a compensation multiplier using the target display luminance information and the brightness input; and
        transmit the composed framebuffer content for presentation on the at least one display, wherein the compensation multiplier is used to perform a display brightness adjustment on the composed framebuffer content.

2. The computer device of claim 1, wherein the operating system is further operable to:
    transmit the compensation multiplier and the composed framebuffer content to a driver on the computer device to perform the display brightness adjustment on the composed framebuffer content to generate final display content for presentation on the at least one display.

3. The computer device of claim 1, wherein the operating system is further operable to:
    receive display metadata for the at least one display, wherein the display metadata provides brightness capabilities of the at least one display.

4. The computer device of claim 3, wherein the operating system is further operable to send the display metadata to the one or more applications,
    wherein the one or more applications use the display metadata to generate optimized HDR content within the brightness capabilities of the at least one display.

5. The computer device of claim 3, wherein the operating system is further operable to:
   modify the display metadata for the at least one display using the compensation multiplier to create compensated display metadata that provides modified brightness capabilities of the at least one display; and
   send the compensated display metadata to the one or more applications,
   wherein the one or more applications use the compensated display metadata to generate optimized HDR content within the modified brightness capabilities of the at least one display.

6. The computer device of claim 5, wherein the composed framebuffer content includes the adjusted SDR content and the optimized HDR content.

7. The computer device of claim 1, wherein the brightness input is received from at least one of a user, an ambient sensor on the computer device, system policies, or inputs from other applications.

8. The computer device of claim 1, further comprising:
   the at least one display in communication with the operating system and configured to receive and present the composed framebuffer content.

9. A method for controlling display brightness of content presented on at least one display, comprising:
   receiving, at an operating system on a computer device, a brightness input for controlling a luminance level of the at least one display in communication with the computer device;
   receiving, from one or more applications, high dynamic range (HDR) content and standard dynamic range (SDR) content for presentation on the at least one display;
   receiving target display luminance information for use in determining a relative level of brightness between the received SDR content and the HDR content;
   generating, by the operating system, adjusted SDR content by using the brightness input to modify luminance of the received SDR content;
   blending, by the operating system, the adjusted SDR content and the HDR content together to create a composed framebuffer content with the adjusted SDR content and the HDR content;
   determining a compensation multiplier using the target display luminance information and the brightness input and
   transmitting, by the operating system, the composed framebuffer content for presentation on the at least one display, wherein the compensation multiplier is used to perform a display brightness adjustment on the composed framebuffer content.

10. The method of claim 9, further comprising:
    transmitting the compensation multiplier and the composed framebuffer content to a driver on the computer device to perform the display brightness adjustment on the composed framebuffer content to generate final display content for presentation on the at least one display.

11. The method of claim 9, further comprising:
    receiving display metadata for the at least one display, wherein the display metadata provides brightness capabilities of the at least one display.

12. The method of claim 11, further comprising:
    sending the display metadata to the one or more applications,
    wherein the one or more applications use the display metadata to generate optimized HDR content within the brightness capabilities of the at least one display.

13. The method of claim 11, further comprising:
    modifying the display metadata for the at least one display using the compensation multiplier to create compensated display metadata that provides modified brightness capabilities of the at least one display; and
    sending the compensated display metadata to the one or more applications,
    wherein the one or more applications use the compensated display metadata to generate optimized HDR content within the modified brightness capabilities of the at least one display.

14. The method of claim 13, wherein the composed framebuffer content includes the adjusted SDR content and the optimized HDR content.

15. The method of claim 9, wherein the brightness input is received from at least one of a user, an ambient sensor on the computer device, system policies, or inputs from other applications.

16. The method of claim 9, further comprising:
    receiving the composed framebuffer content at the at least one display in communication with the operating system; and
    presenting the composed framebuffer content on a user interface of the at least one display.

17. A non-transitory computer-readable medium storing instructions executable by a computer device, comprising:
    at least one instruction for causing the computer device to receive a brightness input for controlling a luminance level of at least one display in communication with the computer device;
    at least one instruction for causing the computer device to receive, from one or more applications, high dynamic range (HDR) content and standard dynamic range (SDR) content for presentation on the at least one display;
    at least one instruction for causing the computer device to receive target display luminance information for use in determining a relative level of brightness between the received SDR content and the HDR content;
    at least one instruction for causing the computer device to generate adjusted SDR content by using the brightness input to modify luminance of the received SDR content;
    at least one instruction for causing the computer device to blend the adjusted SDR content and the HDR content together to create a composed framebuffer content with the adjusted SDR content and the HDR content;
    at least one instruction for causing the computer device to determine a compensation multiplier using the target display luminance information and the brightness input; and
    at least one instruction for causing the computer device to transmit the composed framebuffer content for presentation on the at least one display, wherein the compensation multiplier is used to perform a display brightness adjustment on the composed framebuffer content.

18. The non-transitory computer-readable medium of claim 17, further comprising:
    at least one instruction for causing the computer device to transmit the compensation multiplier and the composed framebuffer content to a driver on the computer device to perform the display brightness adjustment on the composed framebuffer content to generate final display content for presentation on the at least one display; and at least one instruction for causing the computer device to receive the final display content at the at least one display; and at least one instruction for causing the computer device to present the final display content on a user interface of the at least one display.

\* \* \* \* \*